United States Patent Office 3,248,294
Patented Apr. 26, 1966

3,248,294
NOVEL 13β-ALKYL-4,9,11-GONATRIENE-3-ONES
Gerard Nomine, Noisy-le-Sec, Robert Bucourt, Clichy-sous-Bois, and Andre Pierdet, Noisy-le-Sec, France, assignors to Roussel-UCLAF, Paris, France, a corporation of France
No Drawing. Filed Sept. 18, 1964, Ser. No. 397,628
Claims priority, application France, Apr. 20, 1962, 895,239; Feb. 20, 1963, 925,431; Mar. 28, 1963, 929,604
20 Claims. (Cl. 167—74)

The present application is a continuation-in-part application of our copending applications Serial No. 272,243 filed April 11, 1963, and Serial No. 345,601 filed February 18, 1964, both cases now abandoned.

The invention relates to novel gonatrienes of the formula

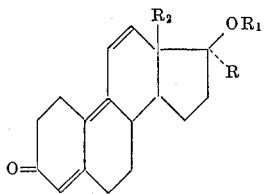

(I)

wherein R is selected from the group consisting of hydrogen and alkyl of 1 to 12 carbon atoms, $R_1$ is selected from the group consisting of hydrogen and an acyl radical of an organic carboxylic acid having 1 to 18 carbon atoms and $R_2$ is an alkyl of 1 to 4 carbon atoms. The invention also relates to a novel process for the preparation of gonatrienes of Formula I and to novel intermediates formed therein. The invention further relates to compositions having anabolic activity and to a novel method of promoting proteic anabolism.

The novel gonatrienes of Formula I possess an excellent anabolic and usually androgenic activity and can be used for the treatment of disturbances of cellular edification and of proteic anabolism, particularly for the treatment of retardation of staturoponderal growth, of symptomatic or essential thinness and of illnesses or senescence or of masculine or feminine genital suspension. Also, at low dosages, the gonatrienes of Formula I have a very low androgenic activity while having a high anabolic activity and are, therefore, useful for the treatment of young subjects or invalids of the feminine sex without fear of the side effects of virilism.

It is an object of the invention to provide novel gonatrienes of Formula I.

It is another object of the invention to provide a novel process for the preparation of the novel gonatrienes of Formula I.

It is a further object of the invention to provide novel intermediates for the novel gonatrienes of Formula I.

It is an additional object of the invention to provide novel compositions having anabolic activity.

It is another object of the invention to provide a novel method of promoting proteic anabolism.

These and other objects and advantages of the invention will become obvious from the following detailed description.

The novel $\Delta^{4,9,11}$-gonatrienes of the invention have the formula

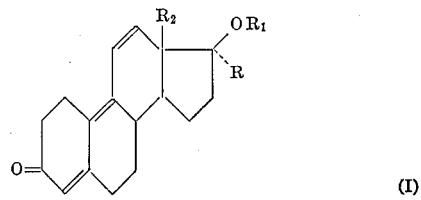

(I)

wherein R is selected from the group consisting of hydrogen and alkyl of 1 to 12 carbon atoms, $R_1$ is selected from the group consisting of hydrogen and an acyl radical of an organic carboxylic acid having 1 to 18 carbon atoms and $R_2$ is an alkyl of 1 to 4 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelargic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butyrylacetic acid; amino acids such as diethylaminoacetic acid and aspartic acid.

The process of the invention for the preparation of 13β-alkyl-$\Delta^{4,9,11}$-gonatriene-3-ones of the formula

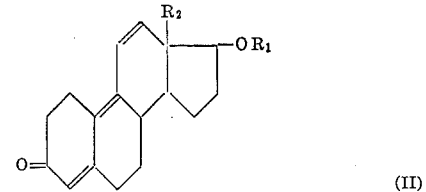

(II)

wherein $R_1$ and $R_2$ have the above definitions comprises reacting 3-chloro-13β-alkyl-17β-OAc-4,5-seco-$\Delta^{2,9}$-gonadiene-5-one wherein Ac is an acyl radical of an organic carboxylic acid having 1 to 7 carbon atoms with an acetic acid esterifying agent in the presence of an acid catalyst to form 3-chloro-5-acetoxy-13β-alkyl-17β-OAc-4,5-seco-$\Delta^{2,5(10),9(11)}$-gonatriene, brominating the latter in the presence of a tertiary base to form 3-chloro-11-bromo-13β-alkyl-17β-OAc-4,5-seco-$\Delta^{2,9}$-gonadiene-5-one, dehydrobrominating the latter to form 3-chloro-13β-alkyl-17β-OAc-4,5-seco-$\Delta^{2,9,11}$-gonatriene-5-one, hydrolyzing the latter under acidic conditions to form 13β-alkyl-17β-OAc-4,5-seco-$\Delta^{9,11}$-gonadiene-3,5-dione, cyclizing the latter under alkaline conditions to form 13β-alkyl-17β-OAc-Δ⁴,⁹,¹¹-gonatriene-3-one which can be saponified under alkaline conditions to form 13β-alkyl-Δ⁴,⁹,¹¹-gonatriene-17β-ol-3-one. The latter can be esterified with an esterification derivative of an organic carboxylic acid having 1 to 18 carbon atoms such as the corresponding acid chloride or acid anhydride. This process is illustrated in Table I.

TABLE I

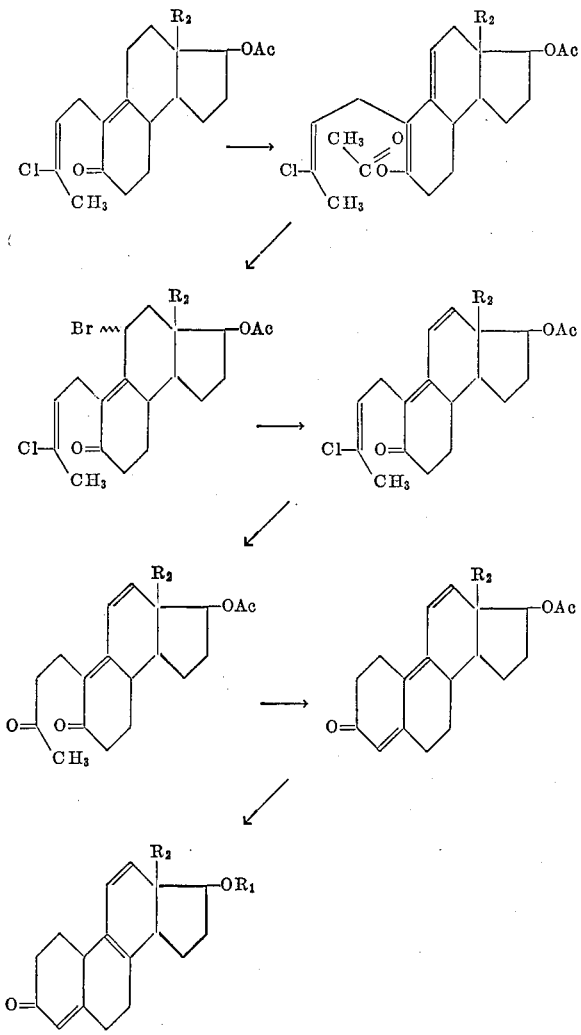

wherein $R_1$, $R_2$ and Ac have the above definitions.

The process of the invention for the preparation of 13β-alkyl-Δ⁴,⁹,¹¹-gonatriene-3-ones of the formula

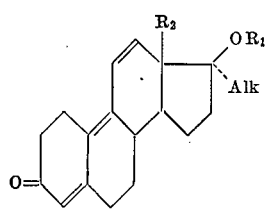

(III)

wherein $R_1$ and $R_2$ have the above definitions and Alk is an alkyl radical of 1 to 12 carbon atoms comprises reacting a 13β-alkyl-Δ⁴,⁹,¹¹-gonatriene-17β-ol-3-one with a compound selected from the group consisting of hydroxylamine and α-lower alkyl hydroxylamines and their acid salts to form the corresponding 3-oximido-13β-alkyl-Δ⁴,⁹,¹¹-gonatriene-17β-ol, oxidizing the latter to form the corresponding 3-oximido-13β-alkyl-Δ⁴,⁹,¹¹-gonatriene-17-one, reacting the latter with a lower alkyl metallic compound to form the corresponding 3-oximido-13β-alkyl-17α-lower alkyl-Δ⁴,⁹,¹¹-gonatriene-17β-ol and hydrolyzing the latter under acidic conditions to form a 13β-alkyl-17α-lower alkyl-Δ⁴,⁹,¹¹-gonatriene-17β-ol-3-one of Formula III which can be esterified in the 17-position with an acylating agent of an organic carboxylic acid having 1 to 18 carbon atoms such as an acid anhydride or acid halide. The reaction scheme is illustrated in Table II.

TABLE II

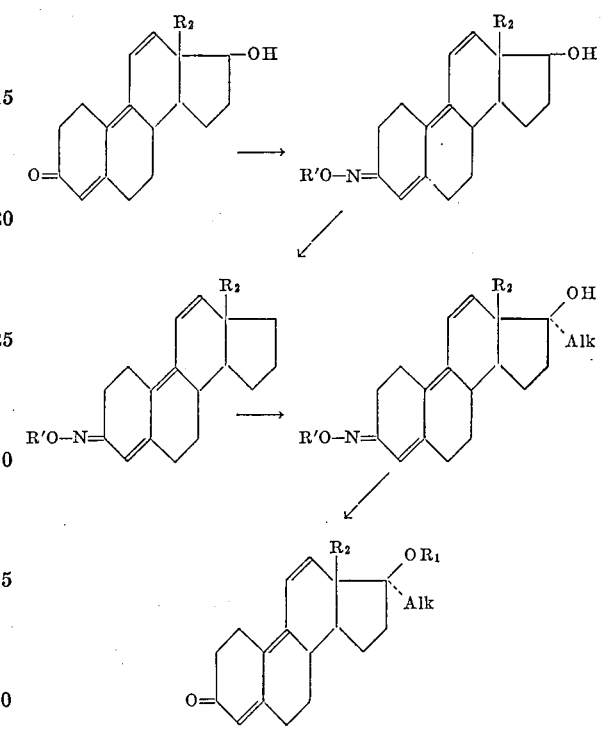

wherein $R_1$ and $R_2$ have the above definitions, R' is selected from the group consisting of hydrogen and a lower alkyl radical and Alk is an alkyl of 1 to 12 carbon atoms.

Because of the reactivity of the double bonds in the 4–5, 9–10 and 11–12 positions of the 13β-alkyl-Δ⁴,⁹,¹¹-gonatriene-17β-ol-3-ones, the 3-keto group cannot be blocked with the usual steroid blocking groups such as cyclic acetals, enol ethers or enamines. The formation of the 3-oximido group assures protection of the 3-keto group during the introduction of the lower alkyl group in the 17-position and permits an easy conversion back to the 3-keto group when desired.

The oxidation of the 17β-hydroxy group is advantageously effected by double exchange of the functions with a ketone in the presence of aluminum alcoholate, i.e., with cyclohexanone in the presence of aluminum isopropylate according to the Oppenauer process. Examples of suitable lower alkyl metallic compounds are alkyl magnesium halides such as methyl magnesium bromide, methyl magnesium iodide, butyl magnesium bromide, decyl magnesium bromide, etc.

A preferred mode of the process of the invention for the preparation of 13β-alkyl-Δ⁴,⁹,¹¹-gonatriene-3-ones of Formula II comprises reacting 3-chloro-13β-alkyl-17β-benzoyloxy-4,5-seco-Δ²,⁹-gonadiene-5-one with acetic acid anhydride in an inert organic solvent such as toluene in the presence of an acid catalyst such as p-toluene sulfonic acid to form 3-chloro-5-acetoxy-13β-alkyl-17β-benzoyloxy-4,5-seco-Δ²,⁵⁽¹⁰⁾,⁹⁽¹¹⁾-gonatriene, brominating the latter with a solution of bromine in acetic acid in the presence of a tertiary amine such as a collidine to form 3 - chloro - 11-bromo-13β-alkyl-17β-benzoyloxy-4,5-seco- $\Delta^{2,9}$-gonadiene-5-one, dehydrobrominating the latter with a mixture of lithium carbonate and lithium bromide in an N,N-dilower alkyl lower alkanoic acid amide such as dimethylformamide to form 3-chloro-13β-alkyl-17β-benzoyloxy-4,5-seco-$\Delta^{2,9,11}$-gonatriene-5-one, hydrolyzing the latter in the presence of a mineral acid such as sulfuric acid to form 13β - alkyl-17β-benzoyloxy-4,5,-seco-$\Delta^{9,11}$-gonadiene-3,5-dione, cyclizing the latter with sodium tert.-amylate in an inert organic solvent such as toluene to form 13β - alkyl-17β-benzoyloxy-$\Delta^{4,9,11}$-gonatriene-3-one and saponifying the latter with an alkali metal alkanolate such as methanolic potassium hydroxide in the presence of hydroquinone to form 13β-alkyl-$\Delta^{4,9,11}$-gonatriene-17β-ol-3-one.

A preferred mode of the process for the preparation of 13β-alkyl-$\Delta^{4,9,11}$-gonatriene-3-ones of Formula III comprises reacting a 13β-alkyl-$\Delta^{4,9,11}$-gonatriene-17β-ol-3-one with hydroxylamine hydrochloride in the presence of sodium acetate to form a 3-oximido-13β-alkyl-$\Delta^{4,9,11}$-gonatriene-17β-ol, oxidizing the latter by reaction with cyclohexanone in the presence of aluminum isopropylate to form a 3-oximido-13β-alkyl-$\Delta^{4,9,11}$-gonatriene-17-one, reacting the latter with a lower alkyl magnesium halide to form the corresponding 3-oximido-13β-alkyl-17α-lower alkyl-$\Delta^{4,9,11}$-gonatriene-17β-ol and hydrolyzing the latter in the presence of an acid such as pyruvic acid or nitrous acid to form a 13β-alkyl-$\Delta^{4,9,11}$-gonatriene-3-one of Formula III.

The novel compositions of the invention having anabolic activity are comprised of a gonatriene having the formula

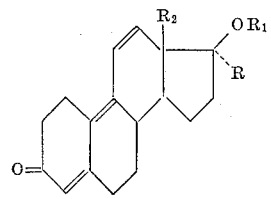

wherein R is selected from the group consisting of hydrogen and lower alkyl, $R_1$ is selected from the group consisting of hydrogen and an acyl radical of an organic carboxylic acid having 1 to 18 carbon atoms and $R_2$ is an alkyl of 1 to 4 carbon atoms and a major amount of a pharmaceutical carrier. The compositions can be in the form of injectable solutions or suspensions, prepared in ampules, in multiple-dose flacons, in the form of tablets, of glossettes, of drops and of suppositories prepared in the usual fashion.

The novel method of the invention for promoting proteic anabolism comprises administering daily an effective amount of a gonatriene having the formula

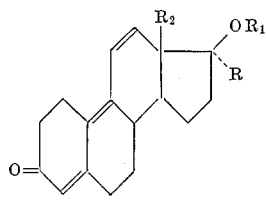

wherein R is selected from the group consisting of hydrogen and lower alkyl, $R_1$ is selected from the group consisting of hydrogen and an acyl radical of an organic carboxylic acid having 1 to 18 carbon atoms and $R_2$ is an alkyl having 1 to 4 carbon atoms. The said gonatrienes can be administered by oral, perlingual, transcutaneous or rectal methods. The usual useful dose is between 0.1 and 50 mg. per dose and per day in the adult depending upon the method of administration and the compound utilized.

Particularly, in the case of compounds of general formula

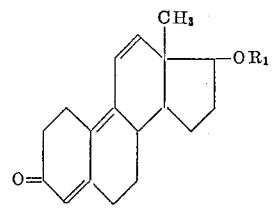

wherein $R_1$ has the above definition, the usual useful dosage is between 5 and 50 mg. per dose and per day in the adult depending upon the method of administration.

In the specific case of compositions containing 13β-methyl - 17α - methyl-$\Delta^{4,9,11}$-gonatriene-17β-ol-3-one, the useful dosage of the said compound is between 0.1 and 2 mg. per day in the adult depending upon the method of administration.

The 3-chloro-17β-OAc-4,5-seco-$\Delta^{2,9}$-gonadienes-5-ones which are used as starting materials for the process of the invention may be made as described in United States Patent No. 3,050,550 issued August 21, 1962.

In the following examples there are described several preferred embodiments to illustrate the invention. However, it should be understood that the invention is not limited to the specific embodiments.

*Example I.—Preparation of 13β-methyl-$\Delta^{4,9,11}$-gonatriene-17β-ol-3-one*

*Step A: 3-chloro-5-acetoxy-13β-methyl-17β-benzoyloxy-4,5-seco-$\Delta^{2,5(10),9(11)}$-gonatriene.*—4 gm. of 3-chloro-13β-methyl-17β-benzoyloxy-4,5-seco-$\Delta^{2,9}$ - gonadiene - 5 - one were dissolved in 100 cc. of toluene. 160 mg. of p-toluene sulfonic acid and 16 cc. of acetic anhydride were added and the reaction mixture was refluxed for a period of five hours, under an atmosphere of nitrogen, to reach an interior temperature of from 111–112° C. The reaction product was washed with an aqueous solution saturated with sodium bicarbonate and with water. The product was extracted with toluene and the extract was dried over magnesium sulfate and evaporated to dryness under an atmosphere of nitrogen. 4.913 gm. of raw product was obtained. 5 cc. of hexane were added thereto and the mixture was held overnight at 0° C. 4.46 gm. of crystallized product were recovered which were taken up with 25 cc. of isopropyl ether and held for a period of six hours at 0° C.

4.13 gm. (94% yield) of 3-chloro-5-acetoxy-13β-methyl-17β-benzoyloxy-4,5-seco-$\Delta^{2,5(10),9(11)}$-gonatriene having a melting point of 124° C. and a specific rotation $[\alpha]_D^{20} = +93° \pm 1°$ (c.=0.5% in dioxane) were obtained.

The product is not described in the literature.

The product occurred in the form of needles and was soluble in alcohol, ether, acetone, benzene, chloroform, hot isopropyl ether and hot hexane and insoluble in water and dilute aqueous acids and alkalis.

*Analysis.*—$C_{27}H_{31}O_4Cl$; molecular weight=454.98; calculated: C 71.27%, H 6.87%, Cl 7.79%. Found: C 71%, H 6.7%, Cl 7.9%.

*Step B: 3-chloro-13β-methyl-17β-benzoyloxy-4,5-seco-$\Delta^{2,9,11}$-gonatriene-5-one.*—2.5 gm. of 3-chloro-5-acetoxy-13β-methyl-17β-benzoyloxy-4,5-seco - $\Delta^{2,5(10),9(11)}$ - gonatriene were dissolved in 7.5 cc. of anhydrous collidine and 12.5 cc. of acetic acid were added thereto. The reaction mixture was cooled to 5° C. and slowly a solution of acetic acid containing 10.75% of bromine was added. 1.94 gm. of bromine were introduced and the reaction mixture was then poured into a mixture of 100 cc. of water, 50 cc. of ether and 60 gm. of sodium bicarbonate. After 50 cc. of ether were added thereto, the aqueous phase was removed by decantation and the ethereal solutions were washed with an aqueous solution saturated with sodium bicarbonate and with water. The washed solutions were dried over magnesium sulfate and 3-chloro-11-bromo-13β-methyl-17β-benzoyloxy-4,5-seco-Δ$^{2,9}$-gonadiene-5-one was obtained in ethereal solution. This solution could be utilized as such in the next step of the operation.

The product is not described in the literature.

*Dehydrobromination.*—A mixture of 2.5 gm. of lithium bromide, 2.5 gm. of lithium carbonate and 37.5 cc. of dimethylformamide was heated to 100° C. and slowly the ethereal solution of the 11-brominated derivative obtained above was introduced. Then the reaction mixture was maintained for 17 hours at 100° C. After cooling, the contents of the reaction vessel were poured into a mixture of 8.5 cc. of acetic acid, 100 cc. of water and 50 cc. of ether, 50 cc. of ether were added thereto and the aqueous phase was eliminated by decantation. The ethereal solutions were washed with water and evaporated to dryness under vacuum.

2.4 gm. of raw product were recovered which were redissolved in methylene chloride containing one part per thousand of pyridine and the solution was passed through a column containing 23 gm. of magnesium silicate. The column was eluted with methylene chloride containing one part per thousand of pyridine to obtain 2.06 gm. (91% yield with reference to the product obtained in Step A) of 3-chloro-13β-methyl-17β - benzoyloxy - 4,5 - seco - Δ$^{2,9,11}$-gonatriene-5-one.

The product is not described in the literature.

It occurred in the form of a resin and was very soluble in the usual solvents and had the following ultraviolet spectra:

$$\lambda \text{ max. } 289 \text{ m}\mu; \text{ E}^{1\%}_{1\text{ cm.}} = 389$$

$$\lambda \text{ max. } 289 \text{ m}\mu; \text{ E}^{1\%}_{1\text{ cm.}} = 412$$

*Step C: 13β-methyl-17β - benzoyloxy - 4,5 - seco - Δ$^{9,11}$-gonadiene-3,5-dione.*—1.82 gm. of 3-chloro-13β-methyl-17β-benzoyloxy-4,5-seco-Δ$^{2,9,11}$-gonatriene-5-one obtained in Step B were triturated with 12 cc. of sulfuric acid until total dissolution occurred and the resulting solution was poured into an aqueous solution of sodium bicarbonate. The aqueous solution was washed and extracted with ethyl ether. The ethereal extract was washed with sodium bicarbonate in a saturated aqueous solution and with water, dried over magnesium sulfate and evaporated to dryness under vacuum.

1.72 gm. of resin were obtained which were dissolved in methylene chloride and the solution passed through a column of 193 gm. of magnesium silicate. The column was eluted with methylene chloride, then with methylene chloride containing 0.5% of acetone and 0.921 gm. of product were recovered which were dissolved in hot isopropyl ether. The isopropyl ether solution was iced for a period of two hours and 0.885 gm. of 13β-methyl-17β-benzoyloxy-4,5-seco-Δ$^{9,11}$-gonadiene - 3,5 - dione having a melting point of 138–139° C. were obtained.

This product is not described in the literature.

The product occurred in the form of prisms and was soluble in alcohol, ether, acetone and hot isopropyl ether and insoluble in water and dilute aqueous acids and alkalis.

The ultraviolet spectra conformed to the assigned structure.

*Step D: 13β-methyl-17β-benzoyloxy-Δ$^{4,9,11}$-gonatriene-3-one.*—0.400 gm. of 13β-methyl-17β-benzoyloxy-4,5-seco-Δ$^{9,11}$-gonadiene-3,5-dione were dissolved in 4 cc. of toluene under an inert atmosphere. The solution was cooled to 3° C. and 0.48 cc. of a solution of sodium tert.-amylate diluted in 4.8 cc. of anhydrous toluene prepared by refluxing 20 cc. of toluene, 6.25 cc. of tert.-amyl alcohol and 1.4 gm. of sodium for 15 hours in an inert atmosphere were added. The reaction mixture was maintained between 0° and +5° C. for a period of six hours under agitation and an inert atmosphere and then 5 cc. of a 0.2 N solution of acetic acid in toluene were added. The reaction mixture was extracted with toluene and evaporated to dryness. The residue was taken up with ethyl acetate and evaporated to dryness under vacuum. A resin was obtained which was dissolved in methylene chloride. The solution was passed through a column containing 40 gm. of magnesium silicate. The column was eluted with methylene chloride containing 0.5% of acetone and 0.361 gm. of a raw product were thus recovered. This product was dissolved in 1.5 cc. of isopropyl ether and after the solution was added to hot methanol, it was allowed to stand at 0° C. overnight. 0.324 gm. (85% yield) of 13β-methyl-17β-benzoyloxy-Δ$^{4,9,11}$-gonatriene-3-one having a melting point of 154° C. and a specific rotation [α]$_D^{20}$=+117° (c.=0.47% in ethanol) were obtained.

The product is not described in the literature.

The product occurred in the form of needles and was soluble in benzene, hot methanol, hot acetone and hot cyclohexane and insoluble in water and dilute aqueous acids and alkalis.

*Analysis.*—$C_{25}H_{26}O_3$; molecular weight=374.46; calculated: C 80.18%, H 7.00%, O 12.81%. Found: C 80.3%, H 7.1%, O 12.8%.

*Step E: 13β-methyl-Δ$^{4,9,11}$-gonatriene-17β-ol-3-one.*—3 gm. of 13β-methyl 17β-benzoyloxy-Δ$^{4,9,11}$-gonatriene-3-one were dissolved in 15 cc. of methanol. 0.030 gm. of hydroquinone was added and the reaction mixture was heated to reflux while bubbling nitrogen therethrough. Then 1.2 cc. of a methanolic solution containing 11% potassium hydroxide were added and the reflux was maintained for a period of three hours. Then the solution was acidified with 0.36 cc. of acetic acid and the methyl benzoate formed was eliminated by steam distillation. 2.140 gm. of a raw product were obtained which product was dissolved in 20 cc. of methylene chloride.

The solution was passed through 10 parts of magnesium silicate and eluted with 250 cc. of methylene chloride containing 5% of acetone. The weight after evaporation of the solvents was 2.050 gm. This product was recrystallized from isopropyl ether to obtain 1.930 gm. (89% yield) of 13β-methyl-Δ$^{4,9,11}$-gonatriene-17β-ol-3-one having a melting point of 186° C. and a specific rotation [α]$_D^{20}$=+19° (c.=0.45% in ethanol).

This product is not described in the literature.

The product occurred in the form of crystals and was soluble in ether, acetone and hot methanol and insoluble in water and dilute aqueous acids and alkalis.

*Analysis.*—$C_{18}H_{22}O_2$; molecular weight=270.36; calculated: C 79.96%, H 8.20%, O 11.83%. Found: C 80%, H 8.2%, O 12%.

*Step F: 13β-methyl-17β-acetoxy-Δ$^{4,9,11}$-gonatriene-3-one.*—0.300 gm. of 13β-methyl-Δ$^{4,9,11}$-gonatriene-17β-ol-3-one were dissolved in 3 cc. of pyridine at room temperature. 1.5 cc. of acetic acid anhydride were added and the reaction mixture was agitated for a period of four hours under a nitrogen atmosphere. The reaction mixture was precipitated in water, iced and the gum obtained was extracted with methylene chloride. After washing, the organic phase was dried and concentrated to dryness under vacuum. The residue was dissolved in methylene chloride and the solution was passed through a column of magnesium silicate. After elution with methylene chloride containing 1% of acetone and recrystallization in isopropyl ether and hexane, 0.297 gm. (78% yield) of 13β-methyl-17β-acetoxy-Δ$^{4,9,11}$-gonatriene-3-one having a melting point of 96–97° C. and a specific rotation [α]$_D^{20}$=+36.8° (c.=0.37% in methanol) were obtained.

This product is not described in the literature.

The product occurred in the form of colorless platelets and was very soluble in benzene and chloroform, soluble in alcohol and insoluble in water.

The ultraviolet and infrared spectras were in accord with the assigned structure.

*Analysis.*—$C_{20}H_{24}O_3$; molecular weight=312.39; calculated: C 76.89%, H 7.74%. Found: C 76.7%, H 7.6%.

*Example II.—Preparation of 13β-propyl-$\Delta^{4,9,11}$-gonatriene-17β-ol-3one*

*Step A: Preparation of 3-chloro-5-acetoxy-13β-propyl-17β-benzoyloxy-4,5-seco-$\Delta^{2,5(10),9(11)}$ - gonatriene.*—4 gm. of 3-chloro-5-oxo-13β-propyl - 17β - benzoyloxy-4,5-seco-$\Delta^{2,9}$-gonadiene (described in the U.S. Patent No. 3,115,507) were dissolved in 100 cc. of toluene. 160 mg. of p-toluene sulfonic acid and 16 cc. of acetic anhydride were added and the reaction mixture was refluxed for a period of five hours, under an atmosphere of nitrogen to reach an interior temperature of 111–112° C. The reaction product was washed with an aqueous solution saturated with sodium bicarbonate and with water. The product was extracted with toluene and the extract was dried over magnesium sulfate and evaporated to dryness under an atmosphere of nitrogen. 5 cc. of hexane were added to the dry product obtained and the mixture was held overnight at 0° C., then suction-dried. The product obtained was recrystallized from isopropyl ether to obtain 3-chloro-5-acetoxy-13β-propyl-17β-benzoyloxy-4,5-seco-$\Delta^{2,5(10)9(11)}$-gonatriene which is not described in the literature.

*Step B: Preparation of 3-chloro-13β-propyl-17β-benzoyloxy-4,5-seco-$\Delta^{2,9,11}$-gonatriene - 5 - one* (1) *Bromination.*—2.5 gm. of 3-chloro-5-acetoxy-13β-propyl-17β-benzoyloxy-4,5-seco-$\Delta^{2,5(10)9(11)}$-gonatriene were dissolved in 7.5 cc. of anhydrous collidine, and 12.5 cc. of acetic acid were added thereto. The reaction mixture was cooled to 5° C. and slowly a solution of acetic acid containing 10.75% of bromine was added. 1.94 gm. of bromine were thus introduced, and the reaction mixture was then poured into a mixture of 100 cc. of water, 50 cc. of ether and 60 gm. of sodium bicarbonate. After 50 cc. of ether were added thereto, the aqueous phase was removed by decantation, and the ethereal solutions were washed with an aqueous solution saturated with sodium bicarbonate and with water. The washed solutions were dried over magnesium sulfate and 3-chloro-11-bromo-13β-propyl-17β - benzoyloxy - 4,5 - seco-$\Delta^{2,9}$-gonadiene-5-one was thus obtained, which would be utilized as such in the next step of the operation.

The product is not described in the literature.

(2) *Dehydrobromination.*—A mixture of 2.5 gm. of lithium bromide, 2.5 gm. of lithium carbonate and 37.5 cc. of dimethylformamide was heated to 100° C., and slowly the ethereal solution of the 11-brominated derivative obtained above was introduced. Then the reaction mixture was maintained for 17 hours at 100° C. After cooling, the contents of the reaction vessel were poured into a mixture of 8.5 cc. of acetic acid, 100 cc. of water and 50 cc. of ether, 50 cc. of ether were added, and the aqueous phase was eliminated by decantation. The ethereal solutions were washed with water and evaporated to dryness under vacuum. The product thus obtained was subjected to chromatography, which yielded the 3-chloro - 13β - propyl - 17β - benzoyloxy - 4,5 - seco-$\Delta^{2,9,11}$-gonatriene-5-one.

The product is not described in the literature.

*Step C: 13β-propyl-17β-benzoyloxy-4,5-seco-$\Delta^{9,11}$-gonadiene-3,5-dione.*—1.82 gm. of 3-chloro-13β-propyl-17β-benzoyloxy-4,5-seco-$\Delta^{2,9,11}$-gonatriene-5-one were triturated with 12 cc. of sulfuric acid until total dissolution occurred, and the resulting solution was poured into an aqueous solution of sodium bicarbonate. The aqueous solution was extracted with ethyl ether, successively washed with an aqueous solution saturated with sodium bicarbonate and with water, and evaporated to dryness under vacuum. The resinous product thus obtained was subjected to chromatography which yielded 13β-propyl-17β-benzoyloxy-4,5-seco-$\Delta^{9,11}$-gonadiene-3,5-dione.

This product is not described in the literature.

*Step D: 13β-propyl-17β-benzoyloxy-$\Delta^{4,9,11}$-gonatriene-3-one.*—0.400 gm. of 13β-propyl-17β-benzoyloxy-4,5-seco-$\Delta^{9,11}$-gonadiene-3,5-dione were dissolved in 4 cc. of toluene under an inert atmosphere. The solution was cooled to 3° C. and 0.48 cc. of a solution of sodium tert.-amylate (prepared as described hereinafter) diluted in 4.8 cc. of anhydrous toluene were added. The reaction mixture was maintained between 0° and +5° C. for a period of six hours under agitation and an inert atmosphere, and then 5 cc. of a 0.2 N solution of acetic acid in toluene were added. The reaction mixture was extracted with toluene, washed with water, and evaporated to dryness. The residue was taken up with ethyl acetate and evaporated to dryness under vacuum. The resultant resinous product was subjected to chromatography, and 13β-propyl-17β-benzoyloxy-$\Delta^{4,9,11}$-gonatriene-3-one was thus recovered.

The product is not described in the literature.

The sodium tert.-amylate had been prepared by refluxing a mixture of 20 cc. of toluene, 6.25 cc. of tert.-amyl alcohol and 1.4 gm. of sodium for 15 hours in an inert atmosphere.

*Step E: 13β-propyl-$\Delta^{4,9,11}$-gonatriene-17β-ol-3-one.*—3 gm. of 13β-propyl-17β-benzoyloxy-$\Delta^{4,9,11}$-gonatriene-3-one were dissolved in 15 cc. of methanol. 0.030 gm. of hydroquinone was added, and the reaction mixture was heated to reflux while bubbling nitrogen therethrough. Then 1.2 cc. of a methanolic solution containing 11% of potassium hydroxide were added and the reflux was maintained for a period of three hours. Then, the solution was acidified with 0.36 cc. of acetic acid, and the methyl benzoate formed was eliminated by steam distillation. The crude distillation product was dissolved in 20 cc. of methylene chloride. The resulting solution was subjected to chromatography, which yielded 13β-propyl-$\Delta^{4,9,11}$-gonatriene-17β-ol-3-one.

This product is not described in the literature.

*Example III.—Preparation of 13β-methyl-17α-methyl-$\Delta^{4,9,11}$-gonatriene-17β-ol-3-one*

*Step A: Preparation of 3-oximido-13β-methyl-$\Delta^{4,9,11}$-gonatriene-17β-ol.*—1.520 gm. of 13β-methyl-$\Delta^{4,9,11}$-gonatriene-17β-ol-3-one obtained according to Example I were introduced into 38 cc. of ethanol. The reaction mixture was heated to reflux under agitation and under an atmosphere of nitrogen and a solution of 4.350 gm. of sodium acetate, 1.950 gm. of hydroxylamine hydrochloride and 19.5 cc. of distilled water was added thereto. The reflux was maintained under agitation and under nitrogen for a period of about 2 hours and then the reaction mixture was allowed to cool and was poured onto a mixture of water and ice. The precipitate formed was extracted with ethyl acetate and the combined extracts were washed with water several times and distilled under vacuum to dryness to obtain 1.693 gm. of raw 3-oximido-13β-methyl-$\Delta^{4,9,11}$-gonatriene-17β-ol which was used as such for the following step of the synthesis. This product was a mixture of two isomeric forms of the oxime which will be called Forms A and B.

This product is not described in the literature.

By operating in a similar manner as described above but starting from 13β-propyl-$\Delta^{4,9,11}$-gonatriene-17β-ol-3-one, the preparation of which is described in Example II, the reaction proceeds similarly, and yields likewise the 3-oximido-13β-propyl-$\Delta^{4,9,11}$-gonatriene-17β-ol.

*Step B: Preparation of 3-oximido-13β-methyl-$\Delta^{4,9,11}$-gonatriene-17-one.*—1.693 gm. of the product obtained in Step A were introduced into 270 cc. of toluene and 39 cc. of cyclohexanone and the reaction mixture was heated to reflux under agitation and under an atmosphere of nitrogen. Then, a solution of 2 gm. of aluminum isopropylate in 140 cc. of toluene was slowly added while distilling therefrom an identical volume of the solvent.

Next, the reaction mixture had added thereto in one charge 8 cc. of cyclohexanone followed in about one hour by a solution of 1 gm. of aluminum isoproplylate in 100 cc. of toluene while continuing the distillation in order to maintain constant the level of the solvent. The reaction mixture was cooled and the precipitate was vacuum filtered and triturated several times with hot methanol. The methanolic solution was subjected to entrainment with steam for a period of about an hour and a half. The steam distillate was cooled and extracted with ethyl acetate. The combined extracts were washed with water and distilled to dryness under vacuum to obtain 1.445 gm. (86% yield) of raw 3-oximido-13β-methyl-Δ$^{4,9,11}$-gonatriene-17-one and was used as such for the following step of the synthesis. It is not described in the literature.

This product represented a mixture of the two isomeric forms A and B of the said compound. In order to purify this mixture, it was dissolved in methylene chloride and subjected to chromatography through magnesium silicate and elution with methylene chloride containing 1% of methanol to obtain 1.955 gm. (72% yield) of the pure mixture.

3-oximido-13β-propyl-Δ$^{4,9,11}$-gonatriene-17-one is obtained in a similar manner by treating 3-oximido-13β-propyl-Δ$^{4,9,11}$-gonatriene-17-ol as above described.

*Step C: Preparation of 3-oximido-13β-methyl-17α-methyl-Δ$^{4,9,11}$-gonatriene-17β-ol.*—A solution of 0.300 gm. of 3-oximido-13β-methyl-Δ$^{4,9,11}$-gonatriene-17-one in 18 cc. of benzene was introduced at room temperature and under agitation into 90 cc. of 1.64 N solution of methyl magnesium bromide in ether. The reaction mixture was heated to reflux under agitation and under an atmosphere of nitrogen for a period of about 15 hours, then cooled and an excess of an aqueous solution saturated with aluminum chloride was added. The said mixture was extracted with ethyl acetate and the combined extracts were washed with water and distilled to dryness under vacuum to obtain 0.330 gm. of raw 3-oximido-13β-methyl-17α-methyl-Δ$^{4,9,11}$-gonatriene-17β-ol.

This product is not described in the literature.

The product represented a mixture of the two isomeric forms A and B of the said product. In order to purify it, the product was dissolved in 20 cc. of methylene chloride, subjected to chromatography through magnesium silicate and elution with methylene chloride containing 1% of methanol to obtain 0.272 gm. (86% yield) of 3-oximido - 13β-methyl - 17α-methyl-Δ$^{4,9,11}$ - gonatriene-17β-ol in a purified state.

3-oximido-13β-propyl - 17α-methyl-Δ$^{4,9,11}$-gonatriene-17β-ol was obtained in a similar manner by reacting methyl magnesium bromide with 3-oximido-13β-propyl-Δ$^{4,9,11}$-gonatriene-17-one.

*Step D: Preparation of 13β-methyl-17α-methyl-Δ$^{4,9,11}$-gonatriene-17β-ol-3-one.*—A mixture of 0.260 gm. of 3-oximido-13β-methyl - 17α-methyl-Δ$^{4,9,11}$-gonatriene - 17β-ol, 9.5 cc. of acetic acid, 0.95 cc. of pyruvic acid and 9.5 cc. of water was heated to reflux for about one hour under agitation and a nitrogen atmosphere. Next, the reaction mixture was cooled and poured onto a mixture of water and ice. The aqueous mixture was neutralized with sodium bicarbonate and extracted with methylene chloride. The combined extracts were washed with water and distilled to dryness under vacuum. The residue was dissolved in 20 cc. of methylene chloride and subjected to chromatography through magnesium silicate with elution with methylene chloride containing 2% of acetone to obtain 0.144 gm. of 13β-methyl-17α-methyl-Δ$^{4,9,11}$-gonatriene-17β-ol-3-one. After the compound was purified by recrystallization from isopropyl ether, 0.122 gm. (50% yield) of 13β-methyl-17α-methyl-Δ$^{4,9,11}$-gonatriene -17β-ol-3-one having a melting point of 170° C. and a specific rotation $[\alpha]_D^{20} = -58.7°$ (c.=0.5% in ethanol) were obtained.

The product was soluble in ether, acetone and benzene and insoluble in water and dilute aqueous acids and alcohols.

The infra-red spectra is in accord with the proposed structure.

UV spectra (ethanol):

max. 238–239 mμ $E_{1\ cm.}^{1\%} = 203$ inflex. 270 mμ $E_{1\ cm.}^{1\%} = 122$ max. 342 mμ $E_{1\ cm.}^{1\%} = 1{,}035$ or ε 29,400

This compound is not described in the literature.

Cleavage of the 3-oximido group of 3-oximido-13β-propyl-17α-methyl-Δ$^{4,9,11}$-gonatriene-17β-ol, when carried out as described herein above, yields, in a similar manner, less 13β-propyl-17α-methyl-Δ$^{4,9,11}$-gonatriene-17β-ol-3-one.

*Example IV.—Preparation of 13β-methyl-17α-ethyl-Δ$^{4,9,11}$-gonatriene-17β-ol-3-one*

*Step A: Preparation of 3-oximido-13β-methyl-17α-ethyl-Δ$^{4,9,11}$-gonatriene-17β-ol.*—10 gm. of magnesium were placed in suspension in 80 cc. of ether in a round bottom flask. Dropwise, over the period of one hour, under slight reflux, 27 cc. of pure ethyl bromide were added and then the mixture was permitted to cool to obtain a solution of 2.8 N ethyl magnesium bromide. 100 cc. of ether and 1.5 cc. of an ethereal solution of magnesium bromide were introduced into a balloon flask and then dropwise a solution of 0.500 gm. of 3-oximido-13β-methyl-Δ$^{4,9,11}$-gonatriene-17-one produced according to Example I in 25 cc. of ether was added. The mixture was agitated for 5 minutes at room temperature and then 25 cc. of the prepared 2.8 N ethyl magnesium bromide solution were added. The initially yellow suspension turned into a greenish color and it was allowed to stand 18 hours under agitation at a temperature of 20° C. The magnesium complex was then hydrolyzed with 25 cc. of a saturated solution of ammonium chloride which was added drop by drop with constant agitation. Then, 50 cc. of water were added and the aqueous phase was decanted and extracted with ether three times. The ethereal extracts were combined, washed with water, dried and concentrated to dryness under vacuum to obtain 0.550 gm. (yield of 100% of crude product) of a yellow amorphous product.

The crude product in a methylene chloride solution was subjected to chromatography through a column of magnesium silicate. It was eluted first with pure methylene chloride, then with methylene chloride containing 1% of methanol and finally with methylene chloride containing 2% methanol to obtain 0.300 gm. (54% yield) of 3-oximido-13β-methyl-17α-ethyl-Δ$^{4,9,11}$-gonatriene - 17β-ol in the form of a slightly yellow product. Thin-film chromatography showed that the 3-oximido product contained a small quantity of the 3-one hydrolysis product as an impurity.

The oxime represented the following constants:
I.R. spectra—(chloroform)
Presence of a free OH band at 950–990 cm.$^{-1}$ characterizing the group

U.V. spectra—(ethanol)

λ max. 319μ ε=37,600
λ max. 331–332μ ε=33,950
inflexion toward 307μ

*Step B: Preparation of 13β-methyl - 17α - ethyl-Δ$^{4,9,11}$-gonatriene-17β-ol-3-one.*—In a balloon flask, 0.330 gm. of 3-oximido-13β-methyl-17α-ethyl-Δ$^{4,9,11}$-gonatriene-17β- ol were introduced into 9 cc. of acetic acid and 9 cc. of water after which 0.9 cc. of pyruvic acid were added and the mixture was held at reflux for one hour. The mixture was allowed to cool to room temperature and then, under agitation, the reaction mixture was poured into 300 cc. of a sodium bicarbonate saturated solution. The suspension was extracted three times with methylene chloride, and the methylene chloride phases were combined after decantation. The organic extract was washed with water, then dried and evaporated to dryness under vacuum to obtain 0.280 gm. (90% yield) of slightly yellow, armorphous 13β-methyl-17α-ethyl-Δ$^{4,9,11}$-gonatriene-17β-ol-3-one which upon purification by recrystallization from isopropyl ether had a melting point with decomposition toward 100° C.

U.V. spectra—(ethanol)

$\lambda$ max. 233 m$\mu$ $E_{1cm.}^{1\%}$=218

$\lambda$ max. 268 m$\mu$ $E_{1cm.}^{1\%}$=147 inflexion toward 225 m$\mu$ $E_{1cm.}^{1\%}$=208

$\lambda$ max. 343 m$\mu$ $E_{1cm.}^{1\%}$=698 or $\epsilon$=20,850

I.R. spectra—(chloroform)

Band toward 975 cm.$^{-1}$

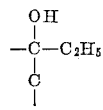

*Example V.—Preparation of 13β-methyl-17α-methyl-Δ$^{4,9,11}$-gonatriene 17β-ol-3-one*

*Step A: Preparation of 3-oximido - 13β - methyl-Δ$^{4,9,11}$-gonatriene-17β-ol.*—3.62 gm. of 13β-methyl-Δ$^{4,9,11}$-gonatriene-17β-ol-3-one produced according to Example I were dissolved in 90 cc. of ethanol and the reaction mixture was heated to reflux under agitation and an atmosphere of nitrogen. A solution of 10.4 gm. of sodium acetate, 4.6 gm. of hydroxylamine hydrochloride and 46 cc. of distilled water was added thereto and the refluxing was maintained for a period of 2 hours. The reaction mixture was poured onto a mixture of water and ice and the aqueous mixture was extracted with methylene chloride. The extract was washed with water and evaporated to dryness under vacuum to obtain 3.75 gm. of raw 3-oximido-13β-methyl-Δ$^{4,9,11}$-gonatriene-17β-ol (mixture of two isomeric forms, identical to those of Step A of Example III).

The raw product was dissolved in 50 cc. of ethyl acetate at reflux and allowed to stand at room temperature for a period of 15 hours. The precipitate was vacuum filtered, washed and dried to obtain 1.535 gm. (yield 38%) of the said oxime which will be called the isomeric form A (melting point 175° C.) solvated with 5% of ethyl acetate.

The product occurred in the form of crystals soluble in chloroform.

*Analysis.*—C$_{18}$H$_{23}$O$_2$N; molecular weight=285.37; calculated: C 75.75%, H 8.12%. Found: C 75.75%, H 8.3%.

The product is not described in the literature.

By evaporation to dryness of the mother liquors of crystallization, 2.49 gm. (yield 65%) of the isomeric form B of the said oxime were obtained.

This product is not described in the literature.

*Step B: Preparation of 3-oximido - 13β - methyl-Δ$^{4,9,11}$-gonatriene-17-one.*—2.49 gm. of oximido-13β-methyl-Δ$^{4,9,11}$-gonatriene-17β-ol isomeric form B, obtained in Step A, were dissolved in 400 cc. of toluene. 70 cc. of cyclohexanone were added thereto and the reaction mixture was heated to reflux under agitation and under an atmosphere of nitrogen. 4.10 gm. of aluminum isopropylate in 330 cc. of toluene were introduced and slowly about 300 cc. of toluene were distilled therefrom. Then, the reaction mixture was cooled to room temperature and filtered. The residue was washed with methanol and the combined solutions were subjected to steam distillation for a period of two hours. The distillate was cooled, vacuum filtered and the precipitate washed with water. 2.04 gm. of product were recovered which was dissolved in 20 cc. of methylene chloride. The solution was subjected to chromatography through a column containing 55 gm. of magnesium silicate and eluted with methylene chloride containing 1% of methanol. After recrystallization from isopropyl ether, 1.34 gm. (yield 54%) of 3-oximido-13β-methyl-Δ$^{4,9,11}$-gonatriene-17-one having a melting point of 191° C. in the form of the B isomer were obtained.

The product is not described in the literature.

While operating in the same manner with 3-oximido-13β-methyl-Δ$^{4,9,11}$-gonatriene-17β-ol (isomeric form A), the isomeric form A of 3-oximido-13β-methyl-Δ$^{4,9,11}$-gonatriene-17-one with a melting point of 212° C. was obtained in a 25% yield.

The product is not described in the literature.

*Step C: Preparation of 3-oximido-13β-methyl-17α-methyl-Δ-$^{4,9,11}$-gonatriene-17β-ol.*—1.10 gm. of 3-oximido-13β-methyl-Δ$^{4,9,11}$-gonatriene-17-one, isomeric form B obtained in Step B, in 60 cc. of benzene were added to 300 cc. of 1.67 N solution of methyl magnesium bromide in ether at room temperature and under an atmosphere of nitrogen. The mixture was heated to reflux for a period of 15 hours, cooled and 200 cc. of a saturated solution of ammonium chloride was added thereto. The reaction mixture was extracted with ethyl acetate and the extract was washed with water and evaporated to dryness under vacuum. The residue was dissolved in methylene chloride and subjected to chromatography through magnesium silicate. On elution with methylene chloride containing 1% of methanol, and recrystallization from a mixture of benzene and hexane, 0.97 gm. (yield 82.5%) of 3-oximido-13β - methyl - 17α - methyl-Δ$^{4,9,11}$-gonatriene-17β-ol, isomeric form B having a melting point of 135° C. were obtained.

The product occurred in the form of pale yellow crystals soluble in acetone, benzene and chloroform.

The product is not described in the literature.

By operating in the same manner with the isomeric A form of 3-oximido-13β-methyl-Δ$^{4,9,11}$-gonatriene-17-one, the isomeric A form of 3-oximido-13β-methyl-17α-methyl-Δ$^{4,9,11}$-gonatriene-17β-ol having a melting point of 120° C. was obtained in a 64% yield.

The product is not described in the literature.

*Step D: Preparation of 13β-methyl-17α-methyl-Δ$^{4,9,11}$-gonatriene-17β-ol-3-one.*—A mixture of 0.85 gm. of the isomeric B form of 3-oximido-13β-methyl-17α-methyl-Δ$^{4,9,11}$-gonatriene-17β-ol obtained in Step B, 30.0 cc. of acetic acid, 3.0 cc. of pyruvic acid and 30.0 cc. of distilled water was heated to reflux for an hour and fifteen minutes under agitation and a nitrogen atmosphere. The reaction mixture was cooled to room temperature and was poured into a mixture of water and ice and sodium bicarbonate was added thereto. Thereafter, the precipitate was filtered, washed with water and dried under vacuum. The residue was dissolved in methylene chloride and passed through a column containing 25 gm. of magnesium silicate. The column was eluted with methylene chloride containing 2% of acetone to obtain 0.55 gm. (yield 69%) of 13β-methyl-17α-methyl-Δ$^{4,9,11}$-gonatriene-17β-ol-3-one which was recrystallized from a mixture of methanol and isopropyl ether (1:4). The purified product had a melting point of 170° C. and a specific rotation [α]$_D^{20}$=−58.7° (c.=0.5% in ethanol).

The product occurred in the form of pale yellow crystals insoluble in water, dilute aqueous acids and alkalis and soluble in ether, acetone and benzene.

*Analysis.*—$C_{19}H_{24}O_2$; molecular weight=284.38; calculated: C 80.24%, H 8.50%. Found: C 80.3%; H 8.3%.

U.V. spectra—(ethanol):

$$\lambda \text{ max. } 239 \text{ m}\mu \text{ } E_{1\text{ cm.}}^{1\%} = 203$$

$$\text{inflex. } 270 \text{ m}\mu \text{ } E_{1\text{ cm.}}^{1\%} = 122$$

$$\lambda \text{ max. } 342 \text{ m}\mu \text{ } E_{1\text{ cm.}}^{1\%} = 1035 \text{ or } \epsilon \text{ } 29,400$$

I.R. spectra—In accord with the proposed structure.

The product was identical to that obtained in Example III.

By operating in the same manner with the isomeric A form of 3-oximido-13β-methyl-17α-methyl-Δ$^{4,9,11}$-gonatriene-17β-ol, quite the same 13β-methyl-17α-methyl-Δ$^{4,9,11}$-gonatriene-17β-ol-3-one having as above a melting point of 170° C. was obtained in a 58% yield.

PHARMACOLOGICAL STUDY OF 13β-METHYL-17β-BENZOYLOXY-Δ$^{4,9,11}$-GONATRIENE-3-ONE

*Determination of androgenic and anabolic activity.*—The tests, being a slight modification of the Hershberger technique (Proc. Soc. Ex. Biol. Med., vol. 83, p. 175 [1953]) consisted of administering subcutaneously daily doses of 20γ, 50γ, 100γ or 275γ of 13β-methyl-17β-benzoyloxy-Δ$^{4,9,11}$-gonatriene-3-one to groups of male rats which had been castrated at an age of three and a half weeks. The treatment was started the day after the castration and was continued for ten days. The animals were sacrificed on the eleventh day, 22 to 26 hours after the last injection. The animals were autopsied after the sacrifice and the organs of interest were separated and weighed, in particular the kidneys, the lifter muscle of the anus (Levator ani) for the myotropic anabolic study as well as the ventral prostrate and the seminal vesicles for the study of the simultaneous androgenic effect. For purposes of comparison, the tests were also conducted with daily doses of 100γ and 275γ of 17β-benzoyloxy-19-nor-testosterone and the results are summarized in Table III.

elevated dosages is about five times that of 17β-benzoyloxy-19-nor-testosterone measured by the weight of the seminal vesicules and about four times measured by the weight of the ventral prostate.

The myotropic and renotropic anabolic activity of 13β-methyl-17β-benzoyloxy-Δ$^{4,9,11}$-gonatriene-3-one is superior to 17β-benzoyloxy-19-nor-testosterone. At the lower doses of 13β-methyl-17β-benzoyloxy-Δ$^{4,9,11}$-gonatriene-3-one, its androgenic activity is nearly null while the anabolic activity remains intact and is about ten times greater than 17β-benzoyloxy-19-nor-testosterone.

Another test was made with 13β-methyl-17β-acetoxy-Δ$^{4,9,11}$-gonatriene-3-one and almost analogous results were obtained.

PHARMACOLOGICAL STUDY OF 13β-METHYL-17α-METHYL-Δ$^{4,9,11}$-GONATRIENE-17β-OL-3-ONE (1) *Determination of androgenic and anabolic activity.*—The tests were effected according to the technique of Hershberger (Proc. Soc. Exp. Biol. Med., 1953, 83, 175), slightly modified. Some male rats castrated at the age of 25 days received the compound studied by daily administration for a period of 10 days except the sixth day. The animals were treated starting from the day after the castration and were sacrificed the eleventh day 22 to 26 hours after the last administration. They were autopsied after the sacrifice and the organis of interest were separated and weighed. In particular, the lifter muscle of the anus (levator ani) was studied for the anabolic action and the ventral prostate and the seminal vesicules were studied for the androgenic effect.

13β - methyl - 17α - methyl-Δ$^{4,9,11}$-gonatriene-17β-ol-3-one in aqueous suspension with carboxymethyl cellulose was administered daily to animals orally in a volume of 0.5 cc. per rat. The 17α-methyl-testosterone to which the product was compared was administered under the same experimental conditions. One lot of control animals received the dispersive alone. The total doses administered to the animals (dose per rat divided into 9 dosages) were 100γ, 500γ, 2 mg. and 10 mg. for 13β-methyl-17α-methyl-Δ$^{4,9,11}$-gonatriene-17β-ol-3-one and 10 mg. and 50 mg. for 17α-methyl-testosterone. The treatment had a duration of 10 days with no administration being made the sixth day. The results are shown in Table IV.

TABLE III

| Treatment | Daily dose | Body Weight In Grams | | Seminal Vesicules (mg.) | Ventral Prostate (mg.) | Fresh Kidney (mg.) | Dried Kidney (mg.) | Fresh Levator ani (mg.) | Dried Levator ani (mg.) | Rf | Rs | Lf | Ls |
|---|---|---|---|---|---|---|---|---|---|---|---|---|---|
| | | Initial | Final | | | | | | | | | | |
| Controls | | 47 | 86 | 5.6 | 14.1 | 441 | 98 | 12.6 | 6.1 | 5.13 | 1.15 | 0.15 | 0.05 |
| 13β-methyl-17β-benzoyloxy-Δ$^{4,9,11}$-gonatriene-3-one. | 20γ | 47 | 95 | 14.8 | 31.8 | 487 | 111 | 38.1 | 10.5 | 5.10 | 1.17 | 0.40 | 0.11 |
| | 50γ | 47 | 99 | 40.7 | 52.1 | 428 | 104 | 57.0 | 14.7 | 4.32 | 1.07 | 0.57 | 0.15 |
| Controls | | 49 | 95 | 6.9 | 10.3 | 426 | 92 | 17.9 | 4.7 | 4.50 | 0.97 | 0.19 | 0.05 |
| 13β-methyl-17β-benzoyloxy-Δ$^{4,9,11}$-gonatriene-3-one. | 100γ | 49 | 96 | 123.5 | 112.0 | 450 | 99 | 62.8 | 14.4 | 4.70 | 1.03 | 0.65 | 0.15 |
| | 275γ | 49 | 96 | 203.3 | 138.3 | 470 | 107 | 90.6 | 20.7 | 5.00 | 1.11 | 0.95 | 0.21 |
| Controls | | 50 | 100 | 4.6 | 4.3 | 478 | 106 | 18.0 | 3.7 | 4.78 | 1.06 | 0.18 | 0.03 |
| 17β-benzoyloxy-19-nor-testosterone. | 100γ | 50 | 92 | 13.6 | 25.6 | 438 | 105 | 36.9 | 7.9 | 4.75 | 1.14 | 0.40 | 0.08 |
| | 275γ | 50 | 89 | 36.3 | 36.0 | 430 | 96 | 56.2 | 12.2 | 4.92 | 1.08 | 0.63 | 0.14 |

$$Rf = \frac{\text{Weight of fresh kidney} \times 1,000}{\text{Body weight}}$$

$$Rs = \frac{\text{Weight of dried kidney} \times 1,000}{\text{Body weight}}$$

$$Lf = \frac{\text{Weight of fresh levator ani} \times 1,000}{\text{Body weight}}$$

$$Ls = \frac{\text{Weight of dried levator ani} \times 1,000}{\text{Body weight}}$$

As can be seen from Table III, the androgenic activity of 13β-methyl-17β-benzoyloxy-Δ$^{4,9,11}$-gonatriene-3-one at

TABLE IV

| Studied | Total Dose in 10 days | Weight Of Animals | | Fresh Kidneys, mg. | Fresh Kidneys Per 1,000-gm. rat, gm. | Dried Kidneys, mg. | Dried Kidneys Per 1,000 gm. rat, gm. |
| --- | --- | --- | --- | --- | --- | --- | --- |
| | | Initial | Final | | | | |
| Controls | | 48 | 84 | 478.6 | 5.828 | 100.0 | 1.225 |
| 13β-methyl-17α-methyl-Δ4,9,11-gonatriene-17β-ol-3-one. | 100γ | 48 | 95 | 532.9 | 5.613 | 113.2 | 1.192 |
| | 500γ | 48 | 96 | 500.2 | 5.215 | 109.3 | 1.138 |
| | 2 mg | 47 | 97 | 567.4 | 5.855 | 124.5 | 1.283 |
| | 10 mg | 47 | 85 | 510.5 | 5.994 | 112.2 | 1.319 |
| 17α-methyl-testosterone | 10 mg | 48 | 72 | 417.6 | 5.832 | 100.2 | 1.278 |
| | 50 mg | 48 | 86 | 534.2 | 5.989 | 108.6 | 1.264 |

| Studied | Total Dose in 10 days | Fresh Levator ani, mg. | Fresh Levator ani per 1,000-gm. ani, gm. | Dried Levator ani, mg. | Dried Levator ani per 1,000-gm. rat, gm. | Seminal Vesicules, mg. | Prostate, mg. |
| --- | --- | --- | --- | --- | --- | --- | --- |
| Controls | | 16.9 | 0.199 | 4.4 | 0.052 | 6.3 | 5.4 |
| 13β-methyl-17α-methyl-Δ4,9,11-gonatriene-17β-ol-3-one. | 100γ | 27.8 | 0.296 | 7.3 | 0.077 | 7.2 | 10.9 |
| | 500γ | 49.9 | 0.519 | 11.0 | 0.114 | 24.3 | 40.5 |
| | 2 mg | 65.3 | 0.674 | 14.5 | 0.149 | 110.9 | 92.6 |
| | 10 mg | 67.9 | 0.794 | 14.5 | 0.169 | 176.3 | 127.0 |
| 17α-methyl-testosterone | 10 mg | 20.1 | 0.269 | 3.6 | 0.048 | 10.7 | 27.1 |
| | 50 mg | 33.1 | 0.387 | 7.1 | 0.083 | 35.0 | 63.8 |

These results of Table IV show that the product studied is clearly more anabolic and more androgenic than 17α-methyl-testosterone and at much lower doses. It is interesting to note that at the lowest total dose of 100γ, 13β - methyl - 17α - methyl-Δ$^{4,9,11}$-gonatriene-17β-ol-3-one showed anabolic activity while being practically devoid of androgenic activity.

(2) *Determination of the toxicity.*—13β-methyl-17α-methyl-Δ$^{4,9,11}$-gonatriene-17β-ol-3-one in suspension in aqueous carboxymethyl cellulose was administered orally to one group of ten mice of the Rockland strain weighing between 18 and 22 gm. at a dose of 50 mg./kg. in a volume of 0.4 cc. per 20 gm. No sign of intoxication or mortality was noted in the mice held under observation for a period of 8 days. 13β-methyl-17α-methyl-Δ$^{4,9,11}$-gonatriene-17β-ol-3-one is thus well tolerated by mice of 50 mg./kg. administered orally.

Various modifications of the process and compositions of the invention may be made without departing from the spirit or scope thereof and it is to be understood that the invention is to be limited only as defined in the appended claims.

We claim:

1. Δ$^{4,9,11}$-gonatrienes of the formula

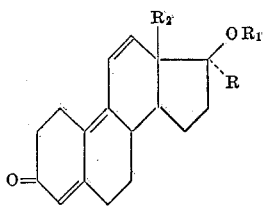

wherein R is selected from the group of hydrogen and an alkyl having 1 to 12 carbon atoms, $R_1$ is selected from the group consisting of hydrogen and an acyl radical of an organic carboxylic acid having 1 to 18 carbon atoms and $R_2$ is an alkyl of 1 to 4 carbon atoms.

2. 13β-methyl-17β-acetoxy-Δ$^{4,9,11}$-gonatriene-3-one.
3. 13β-methyl-Δ$^{4,9,11}$-gonatriene-17β-ol-3-one.
4. 13β - methyl-17α-methyl-Δ$^{4,9,11}$-gonatriene-17β-ol-3-one.
5. 13β - propyl - 17α-methyl-Δ$^{4,9,11}$-gonatriene-17β-ol-3-one.
6. 13β - propyl - 17β - benzoyloxy-Δ$^{4,9,11}$-gonatriene-3-one.
7. 13β-propyl-Δ$^{4,9,11}$-gonatriene-17β-ol-3-one.
8. 13β-methyl-17α-ethyl-Δ$^{4,9,11}$-gonatriene-17β-ol-3-one.
9. A compound of the formula

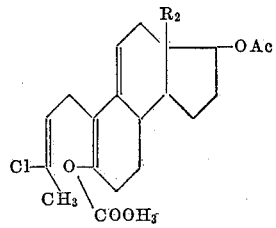

wherein Ac is an acyl radical of an organic carboxylic acid having 1 to 7 carbon atoms and $R_2$ is an alkyl of 1 to 4 carbon atoms.

10. A compound of the formula

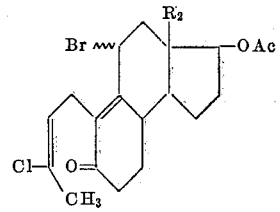

wheerein Ac is an acyl radical of an organic carboxylic acid 1 to 7 carbon atoms and $R_2$ is an alkyl of 1 to 4 carbon atoms.

11. A compound of the formula

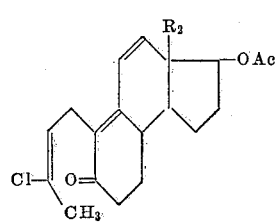

wherein Ac is an acyl radical of an organic carboxylic acid having 1 to 7 carbon atoms and $R_2$ is an alkyl of 1 to 4 carbon atoms.

12. A compound of the formula

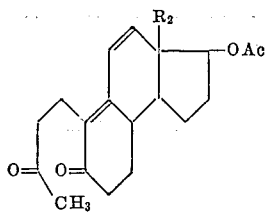

wherein Ac is an acyl radical of an organic carboxylic acid having 1 to 7 carbons atoms and $R_2$ is an alkyl of 1 to 4 carbon atoms.

13. A 3-oximido-$\Delta^{4,9,11}$-gonatriene-17β-ol of the formula

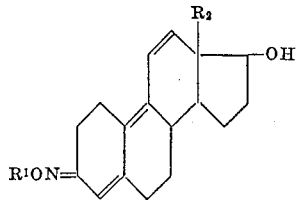

wherein $R^1$ is selected from the group consisting of hydrogen and lower alkyl and $R_2$ is an alkyl of 1 to 4 carbon atoms.

14. A compound of the formula

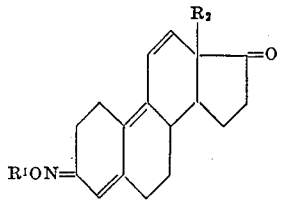

wherein $R^1$ is selected from the group consisting of hydrogen and lower alkyl and $R_2$ is an alkyl of 1 to 4 carbon atoms.

15. A compound of the formula

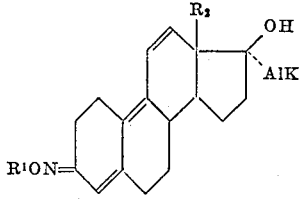

wherein $R^1$ is selected from the group consisting of hydrogen and lower alkyl, $R_2$ is an alkyl of 1 to 4 carbon atoms and AlK is an alkyl of 1 to 12 carbon atoms.

16. A process for the preparation of compounds having the formula

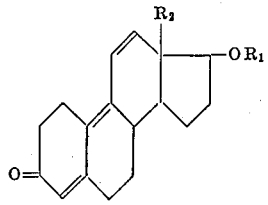

wherein $R_1$ is selected from the group consisting of hydrogen and an acyl radical of an organic carboxylic acid having 1 to 18 carbon atoms and $R_2$ is an alkyl of 1 to 4 carbon atoms which comprises reacting 3-chloro-13β-alkyl-17β-OAc-4,5-seco-$\Delta^{2,9}$-gonadiene-5-one wherein Ac is an acyl radical of an organic carboxylic acid having 1 to 7 carbon atoms with an acetic acid esterifying agent in the presence of an acid catalyst to form 3-chloro-5-acetoxy - 13β-alkyl-17β-OAc-4,5-seco-$\Delta^{2,5(10), 9(11)}$ - gonatriene, brominating the latter in the presence of a tertiary base to form 3-chloro-11-bromo-13β-alkyl-17β-OAc-4,5- seco-$\Delta^{2,9}$-gonadiene-5-one, dehydro brominating the latter to form 3-chloro-13β-alkyl-17β-OAc-4,5-seco-$\Delta^{2,9,11}$-gonatriene-5-one, hydrolyzing the latter under acidic conditions to form 13β-alkyl-17β-OAc-4,5-seco-$\Delta^{9,11}$-gonadiene-3,5-dione, cyclizing the latter under alkaline conditions to form 13β-alkyl-17β-OAc-$\Delta^{4,9,11}$-gonatriene-3-one and recovering a compound of the above formula.

17. A process for the preparation of $\Delta^{4,9,11}$-gonatriene-3-ones of the formula

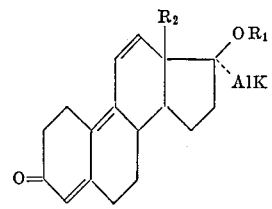

wherein $R_1$ is selected from the group consisting of hydrogen and an acyl radical of an organic carboxylic acid having 1 to 18 carbon atoms, $R_2$ is an alkyl of 1 to 4 carbon atoms and AlK is an alkyl of 1 to 12 carbon atoms which comprises reacting 13β-alkyl-$\Delta^{4,9,11}$-gonatriene-17β-ol-3-one with a compound selected from the group consisting of hydroxylamine and α-lower alkyl hydroxylamines and their acid salts to form the corresponding 3-oximido-13β-alkyl-$\Delta^{4,9,11}$-gonatriene - 17β - ol, oxidizing the latter to form the corresponding 3-oximido-13β-alkyl-$\Delta^{4,9,11}$-gonatriene-17-one, reacting the latter with an alkyl metallic compound wherein the alkyl has 1 to 12 carbon atoms to form the corresponding 3-oximido-13β-alkyl-17α-alkyl-$\Delta^{4,9,11}$-gonatriene-17β-ol, hydrolyzing the latter under acidic conditions to form 13β-alkyl-17α-alkyl-$\Delta^{4,9,11}$-gonatriene-17β-ol 3-one and recovering a compound of the above formula.

18. A composition having anabolic activity comprising 0.10 to 50 mg. of a gonatriene of the formula

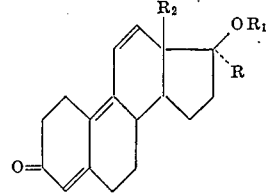

wherein R is selected from the group consisting of hydrogen and an alkyl having 1 to 12 carbon atoms, $R_1$ is selected from the group consisting of hydrogen and an acyl radical of an organic carboxylic acid having 1 to 18 carbon atoms and $R_2$ is an alkyl of 1 to 4 carbon atoms and a major amount of a pharmaceutical carrier.

19. A method of promoting proteic anabolism which comprises administering an effective amount of a gonatriene of the formula

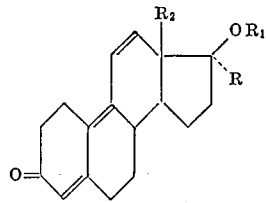

wherein R is selected from the group consisting of hydrogen and an alkyl having 1 to 12 carbon atoms, $R_1$ is selected from the group consisting of hydrogen and an acyl radical of an organic carboxylic acid having 1 to 18 carbon atoms and $R_2$ is an alkyl of 1 to 4 carbon atoms.

20. 3-oximido-13β-propyl-17α - methyl - $\Delta^{4,9,11}$ - gonatriene-17β-ol.

No references cited.

LEWIS GOTTS, Primary Examiner.

H. A. FRENCH, Assistant Examiner.